May 6, 1941.  C. B. KLOPFENSTEIN  2,240,705
UTILITY TOOL
Filed March 9, 1940
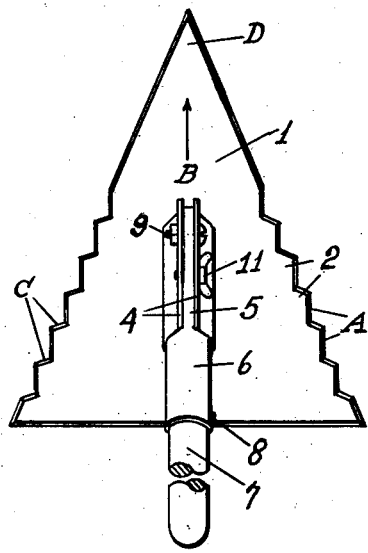
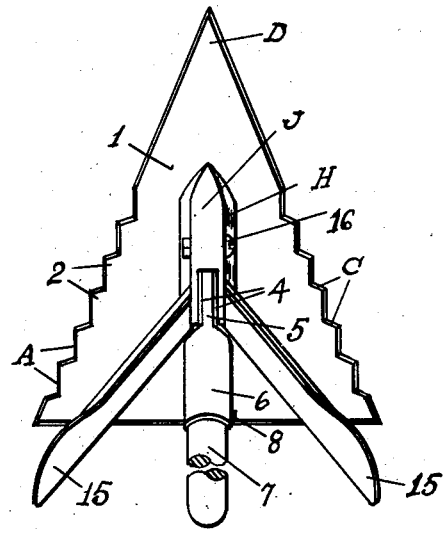
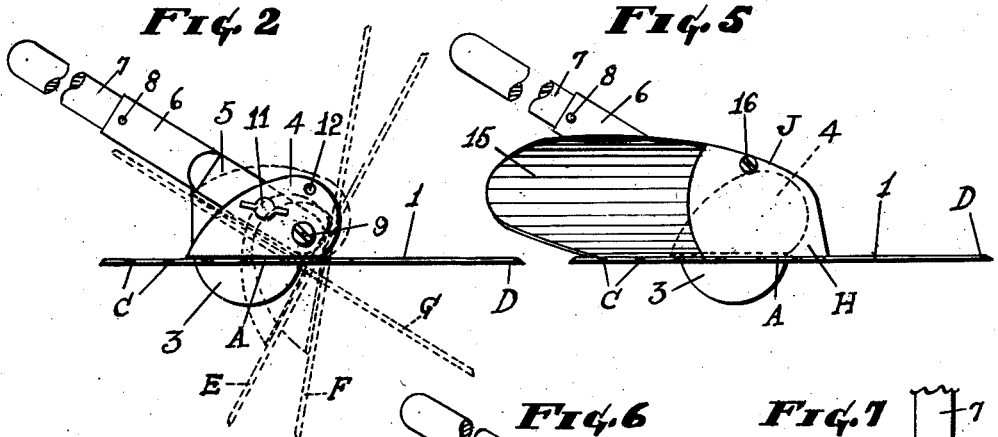
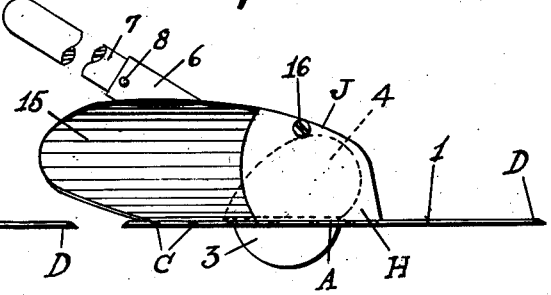
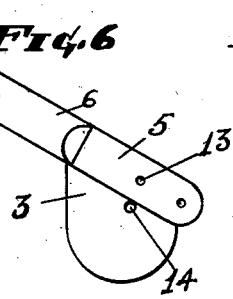
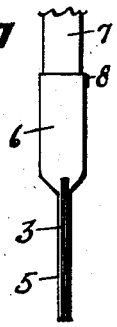
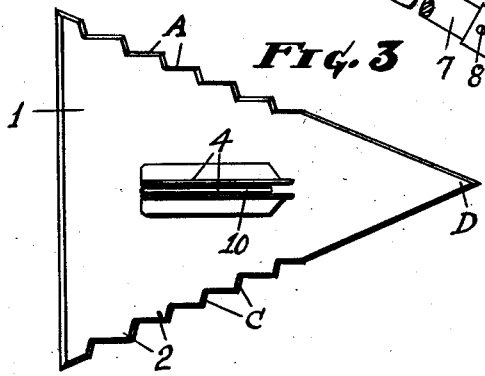
INVENTOR.
CLARA B. KLOPFENSTEIN
BY U. G. Charles
ATTORNEY.

Patented May 6, 1941

2,240,705

UNITED STATES PATENT OFFICE 2,240,705

UTILITY TOOL

Clara B. Klopfenstein, Bonner Springs, Kans.

Application March 9, 1940, Serial No. 323,192

4 Claims. (Cl. 97—68)

My invention relates to a utility tool and has for its principal object the capacity of exterminating weed growth, or the like, and also for cultivating purposes, said tool being convertible to a variety of uses.

A further object of my invention is to provide a triangular blade having attached thereto a rockable handle adjustably secured whereby the entire periphery of the blade is accessible and adaptable to a variety of uses.

A still further object of my invention is to provide means to avoid lateral movement of the blade as forwardly moved by the handle to cause efficient cutting of the oppositely disposed edges as they contact weed growth beneath the surface of the soil.

A still further object of my invention is to provide an efficient detachable mould board carried on the upper side of the blades whereby hilling of vegetation may be accomplished.

A still further object of my invention is to provide a blade triangular in contour and being isosceles in form whereby the two edges of the greater length converge in straight alignment to a apex, hereinafter referred to, as the forward point of the blade.

A still further object of my invention is to provide a series of serrations extending along each greater lengthed edge, the outer points of which are aligned with the unserrated portion of their respective edges, the last named portions and including the edge of the blade connecting the rear points being sharpened by beveling the same from the upper side of the blade, whereby the entire peripheral portion of the blade may be utilized for chopping purposes, but subject to a selected slant of the blade.

These and other objects will hereinafter be more fully explained, reference being had to the accompanying drawing forming a part thereon, in which like characters will apply to like parts in the different views.

Referring to the drawing:

Fig. 1 is a plan view of the tool, the mould board and a portion of the handle removed.

Fig. 2 is a side view of Fig. 1, showing the rockability of the blade by dotted lines.

Fig. 3 is a plan view of the blade with the handle removed.

Fig. 4 is a plan view of the blade with mould board attached.

Fig. 5 is a side view of Fig. 4.

Fig. 6 is a side view of the handle connection to the blade showing the guide plate.

Fig. 7 is an inverted view of Fig. 6.

The invention herein disclosed consists of a triangular blade 1 isosceles in contour wherein its two edges of equal length, each have a serrated edge consisting of a plurality of teeth 2 formed by obtuse notches extending inward of the blade. One side of the notches as at A are in parallelism with the axis of the blade with respect to its line of movement as indicated by arrow B shown in Fig. 1, while the other side of the notches as at C obliquely extend outward and rearward to function as cutting edges, slantingly engaging to accommodate for a better cutting position by saw movement along each individual edge of the teeth; and furthermore to avoid collecting roots or the like without severing the same as they are free to move outward therefrom and in contact with the teeth consecutively until severed. To avoid a lateral movement of the blade when so engaged by roots or the like there is positioned a guide plate 3 (later described) to maintain a straight aligned movement of the blade.

It will be seen that the portion of the blade edges from the point D rearward to where the teeth begin and the rear edge of said blade is straight and beveled from the upper side downward to form a cutting edge for chopping, said edge formation also applying to the sides of the teeth above referred to.

Centrally positioned on one side of the blade is a pair of ears 4 spaced apart and secured to the blade by welding, or otherwise, between which is rockably mounted a shank 5 of a ferruled portion 6 to which a handle 7 is secured by inserting the same in the hollow of the ferrule and being secured against removal by a pin 8 diametrically passing through the ferrule wall and handle. The sides of said shank are in parallelism to fit snugly between said ears and being pivotally connected by a bolt 9 passing through said ears and shank, by which means the blade may be rockable to position the same selectively as shown by dotted lines in Fig. 2.

In Fig. 3 is shown an elongated slot 10 passing through the blade between the ears in parallelism therewith, and through which the said guide plate 3 will extend as rocked by the handle, it being understood that the said plate is integrally joined to the shank and ferruled portion above referred to and rockable therewith.

In the following description it will be assumed that the blade is rocked on the handle, the handle angling upward as shown in Fig. 2. When the blade is rocked to the position shown by dotted lines E, as a preferred chopping position, such position being retained by a wing bolt 11 engaging in an aperture 12 in the ears when in registry with a wing bolt aperture 13 in the handle, while the position of the blade as shown by dotted lines F will bring an aperture 14 in the guide plate and aperture 12 in the ears to registry, and being in such position the tool is inverted so that point D will be employed to form a furrow for planting of seed; in such position, the tool is drawn rearward. When the handle is rocked to parallelism with the blade as shown by dotted lines G, bolt 11 is removed and replaced to engage across the side of the handle opposite the blade; in such position, point D will function as a drill or gouge to mutilate obnoxious weeds. The said blade being positioned as shown in Figs. 2 and 5 and secured in such position by said wing bolt 11 passing through the ears and shank of the handle is a preferred position to move the blade forward, scalping beneath the surface of the soil a short distance to sever obnoxious growth, turning the same under by a pair of mould boards 15 positioned on the upper side of the blade, the corresponding ends of the mould boards being secured to a head structure and the said hood having sides H and a top J to fit snugly on the forward ends of the said ears to enclose the same to avoid soil from entering between said ears when the tool is in use, and the said hood being removably secured by a bolt 16 extending through the hood above the ears tensioning the sides of the hood toward each other and in contact with the ears. The mould boards are adaptable to hilling rows of vegetation as moved therealong. It will also be understood that vegetation may be planted in rows spaced apart sufficient for the blade to pass therebetween, in which case one side of each row will be hilled by the mould boards, and so on for a series of rows hilling both sides in consecutive order.

The said guide plate 3 will function to prevent lateral movement of the blade toward rows being cultivated, such movement may occur as heretofore described, and the plate extending into the ground beneath the tool is means to resist side movement but free to advance forward and rearward in straight alignment.

And such modifications may be made as lie within the scope of the appended claims.

Having fully described my invention what I claim as new and desire to secure by Letters Patent is:

1. In a utility tool, a triangular blade structure having three cutting edges, two of the edges diverging rearwardly from a central forward point to where they meet the other edge portion, a portion of each of said divergent edges being notched to form teeth, the points of the teeth being in alignment with the unnotched portions of said edges, one side of each notch being in parallelism with an axis of the blade extending from the point to the center of its rear edge while the other sides of said notches diverge outward and rearward with respect to said axis, a handle pivotally connected to the blade near the center thereof and the blade having an elongated slot therethrough, and a guide plate secured to the handle and adapted to pass through said slot to penetrate the ground when the blade is moved therealong, counteracting side thrust of either notched edge of the blade.

2. In a utility tool, a tool of the class described comprised of a triangular blade having two forwardly disposed edges serrated from a spaced distance rearward from a point where the said edges meet, the blade having a pair of ears centrally disposed and ranging toward the point, said ears being spaced apart, said blade having an elongated slot positioned between said ears, a shank pivotally carried between said ears, a guide plate carried by the shank to pass through the slot and extending from the blade when said blade is rocked to an acute angle with the shank, a handle and means to secure the same to the shank, means to secure the blade at a selective slant from the handle axis selectively, a hood to enclose the ears, a mould board integrally joined to each side of the hood and resting on the blade, said hood and mould boards removably secured by a frictional engagement of the hood on the ears.

3. In a utility tool, a three pointed blade, said blade having an elongated slot therethrough near the center thereof, the slot being aligned longitudinally with an axis from one of the blade points and centrally of the other two points, a ferruled shank, a plate secured to the shank outwardly extending therefrom, means to pivotally connect the shank to the pointed blade so that the plate of the shank will slidably engage through the slot of the blade when the ferruled shank is rocked on its pivot connection, means to stationarily retain the ferruled shank at a desired angle from the plane of the pointed blade, an elongated handle, one end of which is insertible in the ferrule of the shank, and means to secure the same therein, the handle to serve as conveying means for the pointed blade, and the plate to serve as an agent to guide the blade against lateral movement from its direction of conveyance.

4. In a utility tool, a flat three pointed blade, said blade having an elongated slot therethrough near the center thereof, the slot being aligned longitudinally with an axis from one of the blade points and centrally of the other two points, an ear secured to the blade at each side of the slot in parallelism therewith, said ears being spaced apart and perpendicular to the plane of the blade, a shank, a ferrule and a plate integrally joined, a handle, one end of which is insertible and secured in the ferrule, the shank adapted to be mounted rockably between the ears, and means to connect the shank and ears for such rocking movement, the plate to slidably pass through the slot.

CLARA B. KLOPFENSTEIN.